US009392629B2

(12) United States Patent
Hwang et al.

(10) Patent No.: US 9,392,629 B2
(45) Date of Patent: Jul. 12, 2016

(54) METHOD FOR SETTING SYNCHRONIZATION BETWEEN DEVICE-TO-DEVICE COMMUNICATION TERMINALS BASED ON CELLULAR COMMUNICATION SYSTEM

(71) Applicant: Electronics and Telecommunications Research Institute, Daejeon (KR)

(72) Inventors: You Sun Hwang, Seoul (KR); Hyeong Jun Park, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 165 days.

(21) Appl. No.: 14/022,660

(22) Filed: Sep. 10, 2013

(65) Prior Publication Data
US 2015/0071256 A1    Mar. 12, 2015

(51) Int. Cl.
*H04W 76/02* (2009.01)
*H04W 56/00* (2009.01)
*H04W 74/08* (2009.01)
*H04W 92/18* (2009.01)

(52) U.S. Cl.
CPC .......... *H04W 76/023* (2013.01); *H04W 56/001* (2013.01); *H04W 56/002* (2013.01); *H04W 74/0833* (2013.01); *H04W 92/18* (2013.01)

(58) Field of Classification Search
None
See application file for complete search history.

(56) References Cited

U.S. PATENT DOCUMENTS

| 8,493,887 | B2 | 7/2013 | Palanki et al. | |
|---|---|---|---|---|
| 2010/0118720 | A1* | 5/2010 | Gauvreau et al. | 370/252 |
| 2011/0182280 | A1* | 7/2011 | Charbit et al. | 370/350 |
| 2012/0115518 | A1 | 5/2012 | Zeira et al. | |
| 2013/0122911 | A1* | 5/2013 | Zdarsky | H04W 8/082 455/438 |

(Continued)

FOREIGN PATENT DOCUMENTS

KR   1020110102935   9/2011
WO   2010/035100 A1   4/2010

*Primary Examiner* — Ayaz Sheikh
*Assistant Examiner* — Peter Chau
(74) *Attorney, Agent, or Firm* — Nelson Mullins Riley & Scarborough LLP

(57) ABSTRACT

A method for setting synchronization between terminals performing device-to-device (D2D) communication based on a cellular communication system is disclosed. The method for setting synchronization between terminals includes receiving a message instructing synchronization setting with an opposite terminal from a base station, selecting a first preamble transmitted for a synchronization setting with the opposite terminal based on the message instructing synchronization setting, transmitting the selected first preamble to the opposite terminal, receiving a second preamble from the opposite terminal, and setting the synchronization with the opposite terminal using a reception timing of the second preamble when the second preamble is a preamble designated in the message instructing synchronization setting. Thus, when the present invention is used, synchronization between two terminals performing direct communication may be set using a physical layer random access channel resource which has been used in an existing mobile communication system.

10 Claims, 3 Drawing Sheets

(56) References Cited

U.S. PATENT DOCUMENTS

| | | | |
|---|---|---|---|
| 2013/0308625 A1* | 11/2013 | Park et al. | 370/350 |
| 2014/0010172 A1* | 1/2014 | Wei et al. | 370/329 |
| 2014/0064263 A1* | 3/2014 | Cheng et al. | 370/350 |
| 2014/0099950 A1* | 4/2014 | Mildh et al. | 455/434 |
| 2014/0112332 A1* | 4/2014 | Park et al. | 370/350 |
| 2014/0269641 A1* | 9/2014 | Jang et al. | 370/336 |
| 2014/0286293 A1* | 9/2014 | Jang et al. | 370/329 |
| 2014/0293968 A1* | 10/2014 | Ebrahimi Tazeh Mahalleh et al. | 370/336 |
| 2014/0307611 A1* | 10/2014 | Tesanovic et al. | 370/312 |
| 2014/0321452 A1* | 10/2014 | Choi et al. | 370/350 |
| 2015/0029866 A1* | 1/2015 | Liao et al. | 370/241 |
| 2015/0030015 A1* | 1/2015 | Chu | 370/350 |
| 2015/0043541 A1* | 2/2015 | Blankenship et al. | 370/336 |
| 2015/0373656 A1* | 12/2015 | Kim | H04W 56/002 370/350 |

\* cited by examiner

METHOD FOR SETTING SYNCHRONIZATION BETWEEN DEVICE-TO-DEVICE COMMUNICATION TERMINALS BASED ON CELLULAR COMMUNICATION SYSTEM

BACKGROUND

1. Technical Field

The present invention relates to device-to-device (D2D) communication and more specifically to a method for setting synchronization between terminals in D2D communication based on a cellular communication system.

2. Related Art

Recently, ways of performing direct communication between devices in a cellular communication system have been under discussion. This is because there are requirements of network capacity, data transmission rate, good service quality etc. enabling provision of services to many people, according to rapid increase of data traffic due to spread of various communication terminals.

As a way of satisfying user requirements by enhancing an existing mobile communication network at a low cost, a direct communication between mobile communication devices, that is D2D (device-to-device) communication, has been considered.

A device is a communication terminal included in a cell, and serves the same function as user equipment (UE), but when direct communication is performed between two devices, it is called D2D communication.

The concept of D2D communication is used in fields such as sensor networks, WIFI direct etc., and recently discussions on D2D communication based on a cellular communication system in 3GPP system have also begun.

When D2D communication is performed based on the cellular communication system, there may be merits of wide coverage of a macro cell and resource reusability. Initiation of D2D communication is determined by a base station or a network and the base station or the network should inform the terminal of settings for the D2D communication. In this case, a procedure of setting synchronization between terminals for the D2D communication is needed. In conventional studies, there was no specific suggestion about D2D synchronization setting control.

SUMMARY

An object of the present invention is to provide a method of operating a terminal including a method for setting synchronization between terminals performing D2D communication when the D2D communication is performed in a cellular based mobile communication system.

In addition, another object of the present invention is to provide a method of operating a base station setting synchronization between terminals performing the D2D communication when the D2D communication is performed in the cellular based mobile communication system.

One aspect for achieving the above-mentioned object of the present invention provides a method for setting synchronization between terminals performing device-to-device (D2D) communication, the method including receiving a message instructing synchronization setting with an opposite terminal from a base station, selecting a first preamble transmitted for synchronization setting with the opposite terminal based on the message instructing synchronization setting, transmitting the selected first preamble to the opposite terminal, receiving a second preamble from the opposite terminal, and when the second preamble is a preamble designated in the message instructing synchronization setting, setting the synchronization with the opposite terminal using a reception timing of the second preamble.

Here, in the setting of the synchronization with the opposite terminal, when the first preamble is the same as the second preamble, the synchronization with the opposite terminal may be set using the reception timing of the second preamble.

Here, the message instructing synchronization setting may be a radio resource control (RRC) layer message. At this time, the message instructing synchronization setting may be an RRC connection reconfiguration message.

Here, the first preamble and the second preamble may be random access preambles transmitted through a physical layer random access channel (PRACH).

Here, when the second preamble is a preamble designated in the message instructing synchronization setting, the method may further include transmitting a message instructing synchronization setting success to the base station. At this time, the message instructing synchronization setting success may be an RRC connection reconfiguration complete message.

Another aspect for achieving the above-mentioned object of the present invention provides a method of operating a base station for setting synchronization between terminals performing device-to-device (D2D) communication, the method including transmitting a message instructing synchronization setting to a first terminal and a second terminal performing the D2D communication and receiving a message instructing synchronization setting success from at least one of the first terminal and the second terminal, the message instructing synchronization setting including content designating at least one preamble to be used for synchronization setting by the first terminal and the second terminal.

Here, the message instructing synchronization setting and the message instructing synchronization setting success may be radio resource control (RRC) layer message. At this time, the message instructing synchronization setting may be an RRC connection reconfiguration message, and the message instructing synchronization setting success may be an RRC connection reconfiguration complete message.

Here, the preamble may be a random access preamble of a PRACH transmitted from the terminal.

Here, the message instructing synchronization setting success may be received when a preamble received by the first terminal or second terminal from an opposite terminal is a preamble designated in the message instructing synchronization setting. At this time, the message instructing synchronization setting success may be received from one of the first terminal and second terminal when a preamble received by the first terminal or second terminal from an opposite terminal is the same as a preamble transmitted by the terminal.

As described above, the present invention provides a method for setting synchronization between terminals for D2D communication in a cellular based mobile communication system.

When the method for setting synchronization between terminals according to the present invention is used, setting synchronization between two terminals performing the D2D communication is advantageously enabled using a PRACH which has been used in an existing mobile communication system. That is, in order to provide a D2D communication service, because resources defined in an existing system are used, an object is advantageously enabled to be achieved at a low cost.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
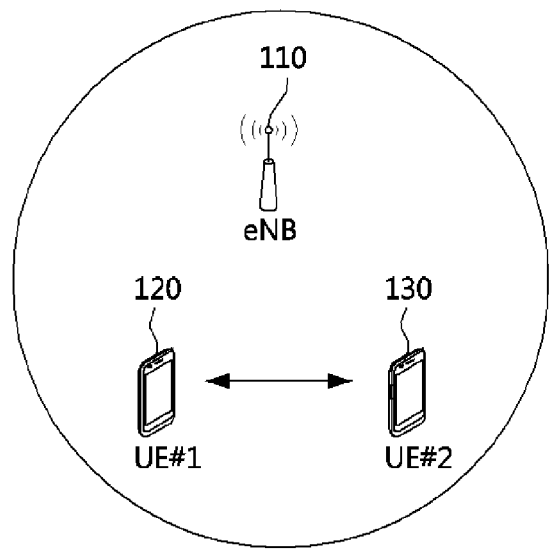
FIG. 1 is a conceptual diagram illustrating a cellular communication system environment to which a method for setting synchronization between terminals is applied according to the present invention.

The present invention may be implemented with various changes and have various example embodiments, and specific embodiments thereof are shown by way of example in the drawings and will herein be described in detail.

However, there is no intent to limit the invention to the particular forms disclosed, but on the contrary, the invention is to cover all modifications, equivalents, and alternatives falling within the spirit and scope of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

As used herein, the term "terminal" may be referred to as a mobile station (MS), user equipment (UE), user terminal (UT), wireless terminal, access terminal (AT), subscriber unit, subscriber station (SS), wireless device, wireless communication device, wireless transmit/receive unit (WTRU), moving node, mobile, or other terms. Various exemplary embodiments of a terminal may include a cellular phone, a smart phone having a wireless communication function, a personal digital assistant (PDA) having a wireless communication function, a wireless modem, a portable computer having a wireless communication function, a photographing apparatus such as a digital camera having a wireless communication function, a gaming apparatus having a wireless communication function, a music storing and playing appliance having a wireless communication function, an Internet home appliance capable of wireless Internet access and browsing, and also portable units or terminals having a combination of such functions, but are not limited to these.

As used herein, the term "base station" refers to a fixed or moving point normally communicating with a terminal, and it may be a word called base station, node-B, enode-B, base transceiver system (BTS), access point, relay and femto-cell etc.

Preferable example embodiments of the present invention will be described in detail below with reference to the accompanying drawings. In the description of the present invention, for easiness of overall understanding, the same reference symbol is used with respect to the same element in drawings, and the repetitive explanation about the same element will be omitted.

In device-to-device (D2D) communication based on a cellular communication system, as one method for providing D2D communication service, D2D communication may be initiated by a base station or a network. In this case, a procedure of synchronization setting between two terminals is needed so that two terminals can perform data transmission through a D2D link.

FIG. 1 is a conceptual diagram illustrating a cellular communication system environment to which a method for setting synchronization between terminals is applied according to the present invention.

Referring to FIG. 1, a first terminal 120 and a second terminal 130 receiving service from a base station 110 are shown. The base station 110 is a serving cell base station to the first terminal 120 and the second terminal 130.

The base station 110 determines whether communication through a cellular link is performed between the first terminal 120 and the second terminal 130 or D2D communication through a D2D link is performed between the first terminal 120 and the second terminal 130. In addition, when the first terminal 120 and the second terminal 130 begin the D2D communication, the base station 110 assigns communication resources for D2D communication.

That is, in a method of D2D communication based on cellular communication, the base station 110 performs setting of the D2D link and the assignment of the resources between the terminals 120 and 130 in a central control way. First, when the base station determines that the base station performs the D2D communication between the two terminals (first terminal and second terminal), the two terminals which are objects of D2D service should set synchronization in order to begin data communication.

As a method of setting synchronization between a base station and a terminal in a cellular based communication system, a primary synchronization signal (PSS)/secondary synchronization signal (SSS), a cell-specific reference signal (RS), and a UE-specific RS may be used in a procedure of downlink synchronization setting, and a demodulation RS (DM-RS), a sounding RS (SRS) etc. may be used in a procedure of uplink synchronization setting.

However, it is difficult to use synchronization setting methods used in an existing system for synchronization setting between terminals, and thus in a method for setting synchronization between terminals according to the present invention, a method of using a random access preamble of a physical layer random access channel (PRACH) is suggested as a method of matching time and symbol synchronization.

A PRACH preamble used in a cellular system is used when the terminal accesses the based station and performs a handover. Thus, when the D2D communication is performed by defining the PRACH preamble for the D2D communication, the base station assigns a random access preamble (hereinafter, 'PRACH D2D preamble') for D2D synchronization setting to the two terminals, and matches time and symbol synchronization of the two terminals using the assigned preamble. For example, a preamble range for D2D synchronization setting among conventionally defined PRACH preambles may be set and a preamble falling in a relevant range may be selected in order to be used for the purpose of setting synchronization between the terminals.

The base station may perform a procedure of setting resources of the PRACH D2D preamble through a procedure of radio resource control (RRC). The base station may respectively designate a D2D preamble for transmission and a D2D preamble for reception to the first terminal and the second terminal, and may designate one D2D preamble commonly used for transmission and reception.

In a procedure of synchronization, each terminal transmits the PRACH D2D preamble assigned for transmission to the base station, receives the PRACH D2D preamble from an opposite terminal when the received preamble is the PRACH D2D preamble assigned for reception from the base station, and may set synchronization for the opposite terminal using the received preamble.

If, the base station commonly designates the preamble for transmission and the preamble for reception to the first terminal and the second terminal, each terminal may set synchronization for the opposite terminal when a preamble the same as a preamble that it has transmitted is received from the opposite terminal using the preamble received from the opposite terminal.

Figure 2:
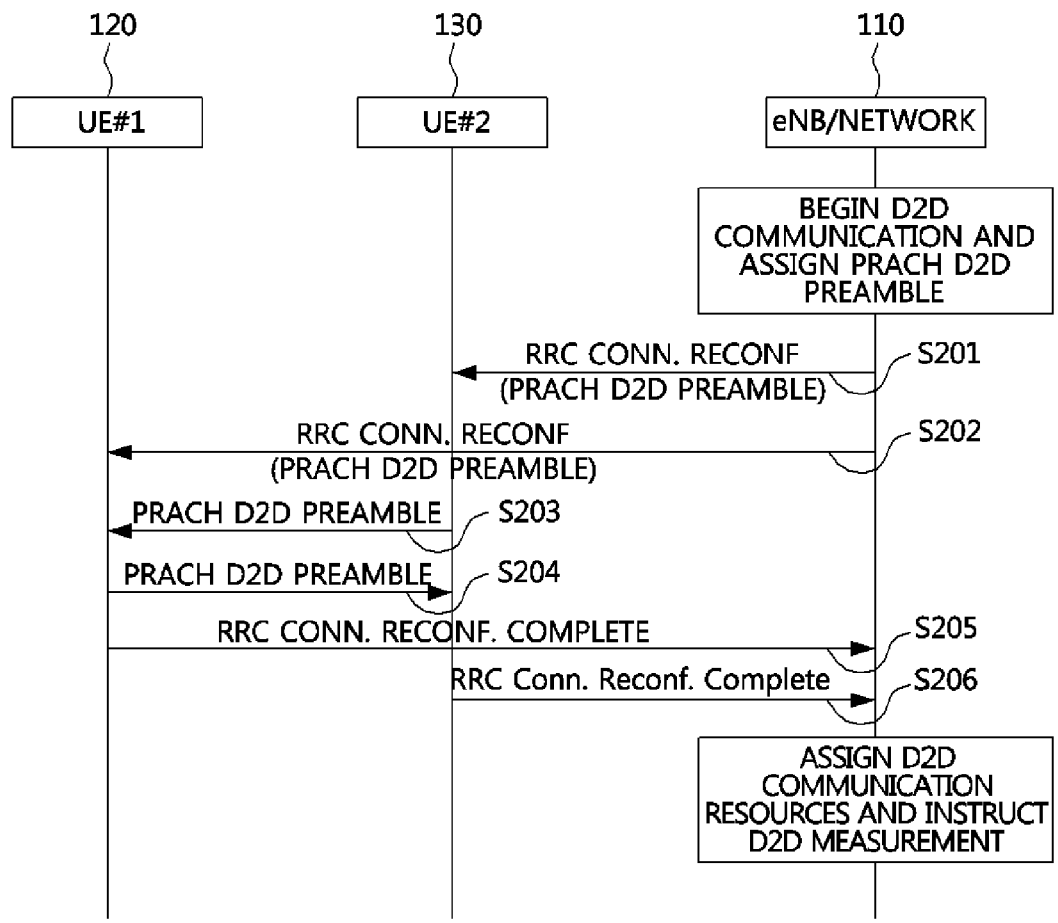
FIG. 2 is a message flowchart illustrating a method for setting synchronization between terminals in D2D communication based on cellular communication according to the present invention.

FIG. 2 is a message flowchart illustrating a method for setting synchronization between terminals in D2D communication based on cellular communication according to the present invention.

A base station or a network side 110 recognizes that the D2D communication between the first terminal 120 and the second terminal 130 is needed, and the base station assigns the PRACH D2D preamble to the two terminals when the two terminals are in one cell.

At this time, the PRACH D2D preamble may be assigned separately for transmission and for reception to each of the terminals (in this case, indexes of preambles for transmission and reception are separately designated), and may be assigned as one for common transmission and reception to each of the terminals (in this case, one preamble index commonly used for transmission and reception is designated).

A message assigning the PRACH D2D preamble may be an RRC layer message, and as one example, an RRC connection reconfiguration message may be used as the message assigning the PRACH D2D preamble.

Referring to FIG. 2, a message designating the PRACH D2D preamble for transmission and for reception is transmitted to the second terminal using the RRC connection reconfiguration message (S201), and the message designating the PRACH D2D preamble for transmission and for reception is also transmitted to the first terminal using the RRC connection reconfiguration message (S202).

At this time, when the message assigning the PRACH D2D preamble separately designates the preamble for transmission and the preamble for reception, the preamble for transmission designated to the first terminal is designated to the second terminal as the preamble for reception, and the preamble for transmission designated to the second terminal is designated to the first terminal as the preamble for reception. If the message assigning the PRACH D2D preamble separately designates the preamble for transmission and reception, one preamble is commonly used for transmission and reception.

Next, the second terminal transmits the PRACH D2D preamble assigned for transmission or assigned for common transmission and reception to the first terminal (S203), and the first terminal transmits the PRACH D2D preamble assigned for transmission or assigned for common transmission and reception to the second terminal (S204).

When the preamble received from the second terminal is the same as the preamble for reception designated from the base station in operation S202, the first terminal determines that the second terminal is a terminal with which to set synchronization, sets synchronization using the preamble received from the second terminal, and generates an RRC connection reconfiguration complete message in order to inform the base station of whether or not D2D synchronization setting was successful (S205).

In addition, when the preamble received from the first terminal is the same as the preamble designated from the base station in operation S201, the second terminal determines that the first terminal is a terminal with which to set synchronization, sets synchronization using the preamble received from the first terminal, and generates an RRC connection reconfiguration complete message in order to inform the base station of whether or not D2D synchronization setting was successful (S206).

When one preamble is commonly used as the preamble for transmission and the preamble for reception, if the preamble transmitted by one terminal is the same as the preamble received from the opposite terminal, the first terminal and the second terminal determine that the opposite terminal is a terminal with which to set synchronization. Thus, the first terminal and the second terminal may set synchronization using the preamble received from the opposite terminal, and generate the RRC connection reconfiguration complete message to inform the base station of whether or not the D2D synchronization setting was successful.

Meanwhile, when the base station receives a message (for example, an RRC connection reconfiguration complete message) instructing synchronization setting completion from the first terminal and the second terminal, the base station performs a D2D measurement procedure for assigning D2D communication resources, and assigns the D2D communication resources to each terminal.

At this time, the message instructing synchronization setting completion may be received from both the first terminal and the second terminal, or may be received from one of the first terminal and the second terminal.

A different point from a procedure of synchronization setting in an existing cellular communication system is that a reference signal is used in a procedure of synchronization setting between the terminal and the base station, but the PRACH D2D preamble is used in the procedure of synchronization setting between terminals.

Hereinafter, a method for setting synchronization between terminals in D2D communication based on a cellular communication system according to the present invention will be separately described with an operation of a terminal and an operation of a base station.

Figure 3:
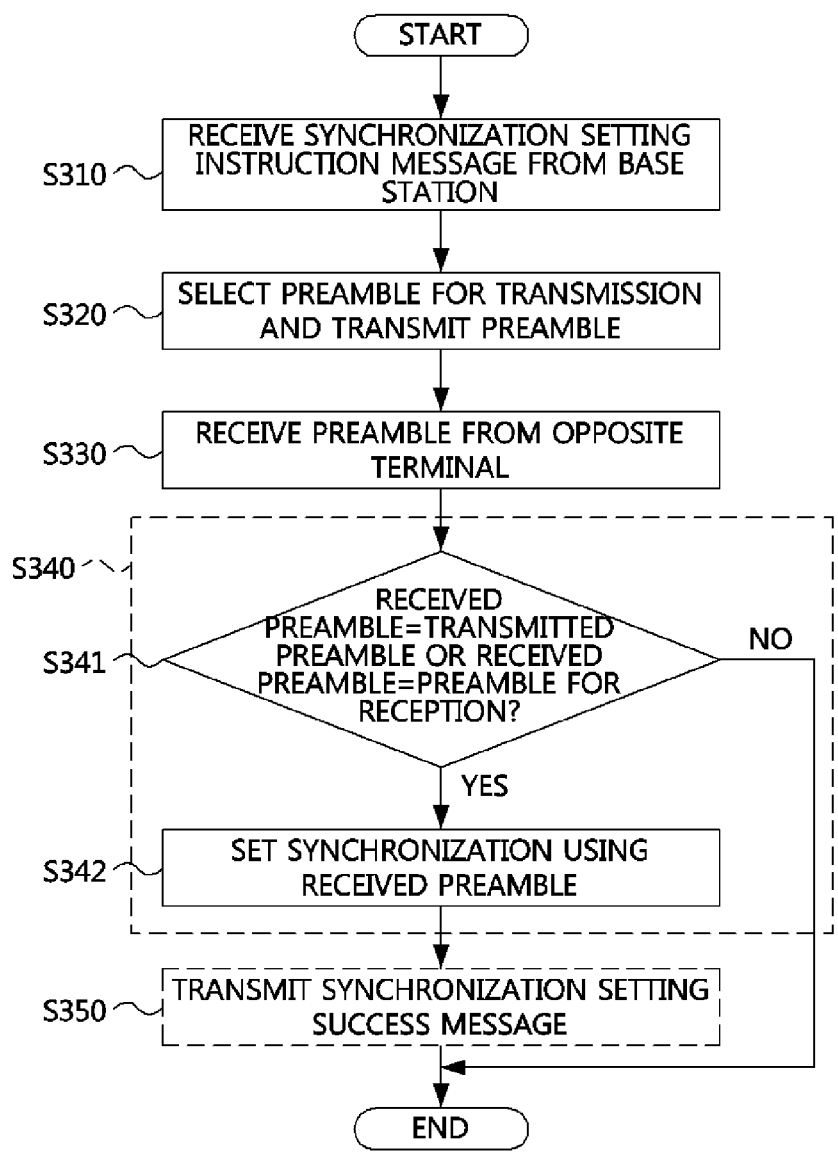
FIG. 3 is flowchart illustrating an operation of a terminal in D2D communication based on cellular communication.

FIG. 3 is flowchart illustrating an operation of a terminal in D2D communication based on cellular communication.

Referring to FIG. 1 and FIG. 2 together, a method described in FIG. 3 is illustrated from the point of view of one of the first terminal 120 and the second terminal 130. In the following description, the second terminal is an opposite terminal from the point of view of the first terminal, and the first terminal is an opposite terminal from the point of view of the second terminal.

Referring to FIG. 3, a method for setting synchronization between terminals performing the D2D communication may include receiving a message instructing synchronization setting with the opposite terminal from the base station by the terminal (S310), selecting a first preamble to be transmitted for synchronization setting with the opposite terminal using the message and transmitting the selected first preamble to the opposite terminal (S320), receiving a second preamble from the opposite terminal (S330) and, setting synchronization with the opposite terminal using the reception timing of the second preamble when the second preamble is a preamble designated in the message instructing synchronization setting (S340).

In operation S310, the terminal receives the message instructing synchronization setting with the opposite terminal from the base station, and here the base station may refer to a serving cell base station to which the terminal is connected. The message received from the base station may be received in various types, and as the most representative example, the message may be received in the RRC layer message type as illustrated with reference to FIG. 2.

As the RRC layer message, an RRC message newly defined for performing the method of the present invention may be used, and the message instructing synchronization setting according to the present invention may be used by adding a conventionally existing RRC message. As a representative example, as the message instructing synchronization setting, an RRC connection reconfiguration message defined in 3GPP TS36.331 may be used.

Meanwhile, the message instructing synchronization setting may include information designating at least one preamble used by the terminal for synchronization setting. As a way of designating the preamble, there may be an IE explicitly designating a preamble index, and an implied way in which a D2D link identifier is given to the terminals for the D2D communication and the preamble index is given by the identifier when this identifier is transferred to the terminals may be used.

At this time, the preamble for transmission transmitted to the opposite terminal and the preamble for reception received from the opposite terminal may be separately designated to the terminal, and one preamble commonly used for transmission and reception may be designated to the terminal. In the description below, the preamble for transmission is called a first preamble and the preamble for reception is called a second preamble, and when the one preamble is used for transmission and reception, the first preamble and the second preamble may be the same preamble. When the preamble for transmission transmitted to the opposite terminal and the preamble for reception received from the opposite terminal are separately designated to the terminals, the preamble for transmission designated to the first preamble is a preamble designated for reception to the second terminal, and the preamble for transmission designated to the second terminal is a preamble designated for reception to the first terminal.

In operation S320, the preamble (that is, the first preamble) to be transmitted to the opposite terminal is selected using information included in the message received from the base station through a process described above, and the selected preamble is transmitted through a PRACH.

Next, in operation S330, the preamble (that is, second preamble) is received from the opposite terminal through the PRACH.

That is, in a procedure described through FIG. 2, the base station transmits the message instructing that a preamble be used for synchronization setting of both terminals, the opposite terminal also transmits a preamble designated from the base station, and the terminal receives the preamble transmitted from the opposite terminal.

Finally, in operation S340, the terminal determines whether the second preamble received from the opposite terminal is a preamble designated in the message instructing synchronization setting (S341), and when the second preamble is the preamble designated in the message instructing synchronization setting, the terminal sets synchronization with the opposite terminal using the reception timing of the second preamble (S342).

At this time, if the preamble for transmission and the preamble for reception are commonly used as described in operation S340, when the first preamble and the second preamble are the same, synchronization with the opposite terminal is set using the reception timing of the second preamble.

That is, the terminal and the opposite terminal transmit the preamble designated from the base station to the respective opposite terminals as designated in the message instructing synchronization setting when the preamble (second preamble) received from the opposite terminal is the preamble designated in the message instructing synchronization setting as the preamble for reception, or the preamble (second preamble) received from the opposite terminal is the same as the preamble (first preamble) transmitted by the terminal, it means that it is designated as a performance object of the D2D communication from the base station. Thus, the terminal obtains synchronization for a link from the opposite terminal to the terminal using the reception timing of the preamble received from the opposite terminal.

Meanwhile, the PRACH is an upward link channel, which means that the terminal performing the D2D communication should have capacity for receiving an existing upward link channel.

Meanwhile, when the preamble (first preamble) transmitted from the terminal is the same as the preamble (second preamble) received from the opposite terminal, or the preamble (second preamble) received from the opposite terminal is the preamble for reception assigned from the base station in operation S340, the terminal may further transmit the message instructing synchronization setting success to the base station (S350).

At this time, the message instructing synchronization setting success like the message instructing synchronization setting may be an RRC layer message.

As the RRC layer message, an RRC message newly defined for performing the method of the present invention may be used, and a conventionally existing RRC message may be used as the message instructing synchronization setting completion according to the present invention. As a representative example, an RRC connection reconfiguration completion message defined in 3GPP TS36.331 may be used as the message instructing synchronization setting completion.

Figure 4:
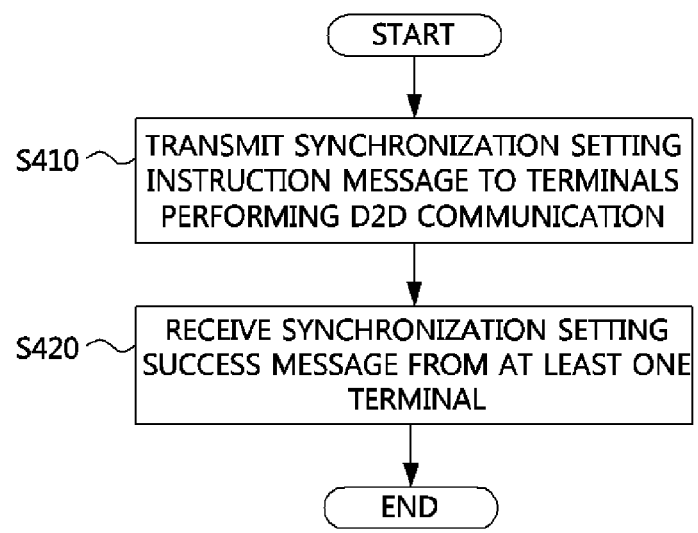
FIG. 4 is a flowchart illustrating a method of an operation of a base station in D2D communication based on cellular communication.

FIG. 4 is a flowchart illustrating a method of an operation of a base station in D2D communication based on cellular communication.

Referring to FIG. 4, the operation of the base station according to the present invention may include transmitting the message instructing synchronization setting to the first terminal and the second terminal performing the D2D communication (S410) and receiving the message instructing synchronization setting success from one of the first terminal and the second terminal (S420). At this time, the message instructing synchronization setting may include content designating at least one preamble to be used for synchronization setting by the first terminal and the second terminal.

Referring to FIG. 1 again, the base station 110 fixes the terminals (first terminal, second terminal) performing the D2D communication, and transmits the message instructing synchronization setting to two terminals in operation S410.

Here, the base station may refer to the serving cell base station to which the terminals performing the D2D communication are connected. The message instructing synchronization setting transmitted from the base station may be transmitted in various types, and may be the RRC layer message type as the most representative example, as described through FIG. 2.

As the RRC layer message, an RRC message newly defined for performing the method of the present invention may be used, and a predetermined IE (information element) may be added to an existing RRC message to be used as the message instructing synchronization setting according to the present invention. As a representative example, the RRC connection reconfiguration message defined in 3GPP TS36.331 may be used as the message instructing synchronization setting.

Meanwhile, the message instructing synchronization setting may include information designating at least one preamble used by the terminal for synchronization setting. As a way of designating the preamble, there may be an IE explicitly designating the preamble index, and an implied way in which the D2D link identifier is given to the terminals for the D2D communication and the preamble index is given by the identifier when this identifier is transferred to the terminals may be used.

At this time, the base station may separately designate the preamble for transmission transmitted to each opposite terminal and the preamble for reception received from each opposite terminal to the terminals, and may designate one preamble commonly used for transmission and reception to the terminals. In the description below, the preamble for transmission is called to the first preamble and the preamble for reception is called to the second preamble, and when the one preamble is used for transmission and reception, the first preamble and the second preamble may be the same preamble. When the preamble for transmission transmitted to the opposite terminal and the preamble for reception received from the opposite terminal are separately designated to the terminals, the preamble designated for transmission to the first terminal is the preamble designated for reception to the second terminal, and the preamble designated for transmission to the second terminal is the preamble designated for reception to the first terminal.

Each of the first terminal and the second terminal receiving the message instructing synchronization setting performs the method of the operation of the terminals described through FIG. 3.

That is, the first terminal obtains synchronization for a link from the second terminal to the first terminal using the reception timing of the preamble transmitted from the second terminal, and the second terminal obtains synchronization for a link from the first terminal to the second terminal using the preamble transmitted from the first terminal.

In operation S410, the base station receives the message instructing synchronization setting success from at least one of the first terminal and the second terminal.

At least one of the first terminal and the second terminal performing the method of operations of the terminals described through FIG. 3 transmits the message instructing synchronization setting success to the base station, and the base station receives the message instructing synchronization setting success transmitted from the terminal to check that the first terminal and the second terminal set synchronization.

Meanwhile, in FIG. 2, transmitting the message instructing synchronization setting success to the base station from both the first terminal and the second terminal is illustrated as an example, but the base station may be configured to check the synchronization setting success when the message instructing synchronization setting success is received from one of the two terminals.

At this time, the message instructing synchronization setting success, like the message instructing synchronization setting described in operation S410, may be an RRC layer message.

As the RRC layer message, an RRC message newly defined for performing the method of the present invention may be used, and a conventionally existing RRC message may be used as the message instructing synchronization setting completion according to the present invention. As a representative example, an RRC connection reconfiguration completion message defined in 3GPP TS36.331 may be used as the message instructing synchronization setting completion.

While the example embodiments of the present invention and their advantages have been described in detail, it should be understood that various changes, substitutions and alterations may be made herein without departing from the scope of the invention.

What is claimed is:

1. A method for setting synchronization between terminals performing device-to-device (D2D) communication, the method comprising:
   receiving, at a first terminal, a message instructing synchronization setting with an opposite terminal from a base station;
   selecting, by the first terminal, a first preamble transmitted for synchronization setting with the opposite terminal based on the message instructing synchronization setting, and transmitting, by the first terminal, the selected first preamble to the opposite terminal;
   receiving, at the first terminal, a second preamble from the opposite terminal; and
   setting, by the first terminal, a synchronization with the opposite terminal using a reception timing of the second preamble when the second preamble is a preamble designated in the message instructing synchronization setting,
   wherein, in the setting of the synchronization by the first terminal with the opposite terminal, when the first preamble is the same as the second preamble, the synchronization with the opposite terminal is set using a reception timing of the second preamble.

2. The method of claim 1, wherein the message instructing synchronization setting is a radio resource control (RRC) layer message.

3. The method of claim 2, wherein the message instructing synchronization setting is an RRC connection reconfiguration message.

4. The method of claim 1, wherein the first preamble and the second preamble are random access preambles transmitted through a physical layer random access channel (PRACH).

5. The method of claim 1, further comprising: transmitting a message instructing synchronization setting success to the base station when the second preamble is a preamble designated in the message instructing synchronization setting.

6. The method of claim 5, wherein the message instructing synchronization setting success is an RRC connection reconfiguration complete message.

7. A method for setting synchronization between terminals performing device-to-device (D2D) communication, the method comprising:

transmitting a message instructing synchronization setting to a first terminal and a second terminal performing the D2D communication; and receiving a message instructing synchronization setting success from at least one of the first terminal and the second terminal, wherein the message instructing synchronization setting includes content designating at least one preamble to be used for synchronization setting by the first terminal and the second terminal, wherein the message instructing synchronization setting success is received when a preamble received by the first terminal or second terminal from an opposite terminal is a preamble designated in the message instructing synchronization setting, and wherein a reception timing of the preamble received by the first or second terminal is used for setting synchronization with the opposite terminal wherein the at least one preamble is a random access preamble of a physical layer random access channel (PRACH) transmitted from at least one of the first terminal and the second terminal, and wherein a time and a symbol synchronization of the first terminal and the second terminal are matched based on the random access preamble.

8. The method of claim 7, wherein the message instructing synchronization setting and the message instructing synchronization setting success are radio resource control (RRC) layer messages.

9. The method of claim 8, wherein the message instructing synchronization setting is an RRC connection reconfiguration message, and the message instructing synchronization setting success is an RRC connection reconfiguration complete message.

10. The method of claim 7, wherein the message instructing synchronization setting success is received from one of the first terminal and second terminal when the preamble received by the first terminal or second terminal from the opposite terminal is the same as a preamble transmitted by the first terminal or second terminal to the opposite terminal.

* * * * *